(12) United States Patent
Philbrick et al.

(10) Patent No.: US 7,167,927 B2
(45) Date of Patent: Jan. 23, 2007

(54) TCP/IP OFFLOAD DEVICE WITH FAST-PATH TCP ACK GENERATING AND TRANSMITTING MECHANISM

(75) Inventors: Clive M. Philbrick, San Jose, CA (US); Laurence B. Boucher, Saratoga, CA (US); Stephen E. J. Blightman, San Jose, CA (US); Peter K. Craft, San Francisco, CA (US); David A. Higgen, Saratoga, CA (US); Daryl D. Starr, Milpitas, CA (US)

(73) Assignee: Alacritech, Inc., San Jose, CA (US)

( * ) Notice: Subject to any disclaimer, the term of this patent is extended or adjusted under 35 U.S.C. 154(b) by 1035 days.

(21) Appl. No.: 10/085,802

(22) Filed: Feb. 26, 2002

(65) Prior Publication Data
US 2002/0095519 A1   Jul. 18, 2002

(51) Int. Cl.
*G06F 15/16* (2006.01)

(52) U.S. Cl. ...................................... 709/250
(58) Field of Classification Search ................. 709/250
See application file for complete search history.

(56) References Cited

U.S. PATENT DOCUMENTS

| | | | |
|---|---|---|---|
| 4,366,538 A | 12/1982 | Johnson et al. | 364/200 |
| 4,589,063 A | 5/1986 | Shah et al. | 710/8 |
| 4,700,185 A * | 10/1987 | Balph et al. | 370/451 |
| 4,991,133 A | 2/1991 | Davis et al. | 364/900 |
| 5,056,058 A | 10/1991 | Hirata et al. | 709/230 |
| 5,058,110 A | 10/1991 | Beach et al. | 370/85.6 |
| 5,097,442 A | 3/1992 | Ward et al. | 365/78 |

(Continued)

FOREIGN PATENT DOCUMENTS

WO   WO/98/19412   5/1998

(Continued)

OTHER PUBLICATIONS

WindRiver article entitled "Tornado: For Intelligent Network Acceleration", copyright Wind River Systems, 2001, 2 pages.

(Continued)

*Primary Examiner*—David Wiley
*Assistant Examiner*—J. Bret Dennison
(74) *Attorney, Agent, or Firm*—Mark Lauer; Silicon Edge Law Group LLP (57) ABSTRACT

A network interface device has a fast-path ACK generating and transmitting mechanism. ACKs are generated using a finite state machine (FSM). The FSM retrieves a template header and fills in TCP and IP fields in the template. The FSM is not a stack, but rather fills in the TCP and IP fields without performing transport layer processing and network layer processing sequentially as separate tasks. The filled-in template is placed into a buffer and a pointer to the buffer is pushed onto a high-priority transmit queue. Pointers for ordinary data packets are pushed onto a low-priority transmit queue. A transmit sequencer outputs a packet by popping a transmit queue, obtaining a pointer, and causing information pointed to by the pointer to be output from the network interface device as a packet. The sequencer pops the high-priority queue in preference to the low-priority queue, thereby accelerating ACK generation and transmission.

30 Claims, 6 Drawing Sheets

U.S. PATENT DOCUMENTS

| | | | | |
|---|---|---|---|---|
| 5,163,131 A | | 11/1992 | Row et al. ................. | 395/200 |
| 5,212,778 A | | 5/1993 | Dally et al. ................ | 395/400 |
| 5,280,477 A | | 1/1994 | Trapp ....................... | 370/85.1 |
| 5,289,580 A | | 2/1994 | Latif et al. ................. | 395/275 |
| 5,303,344 A | | 4/1994 | Yokoyama et al. ......... | 395/275 |
| 5,412,782 A | | 5/1995 | Hausman et al. ........... | 395/275 |
| 5,448,566 A | | 9/1995 | Richter et al. .............. | 370/94.1 |
| 5,485,455 A | * | 1/1996 | Dobbins et al. ............ | 370/255 |
| 5,485,460 A | * | 1/1996 | Schrier et al. .............. | 709/227 |
| 5,485,579 A | | 1/1996 | Hitz et al. ............. | 395/200.12 |
| 5,506,966 A | | 4/1996 | Ban ........................... | 395/250 |
| 5,511,169 A | | 4/1996 | Suda ......................... | 395/280 |
| 5,517,668 A | | 5/1996 | Szwerinski et al. ......... | 395/800 |
| 5,548,730 A | | 8/1996 | Young et al. ............... | 395/280 |
| 5,566,170 A | | 10/1996 | Bakke et al. ................ | 370/60 |
| 5,574,919 A | * | 11/1996 | Netravali et al. ........... | 712/220 |
| 5,588,121 A | | 12/1996 | Reddin et al. ......... | 395/200.15 |
| 5,590,328 A | | 12/1996 | Seno et al. ................. | 395/675 |
| 5,592,622 A | | 1/1997 | Isfeld et al. ........... | 395/200.02 |
| 5,598,410 A | | 1/1997 | Stone ......................... | 370/469 |
| 5,629,933 A | | 5/1997 | Delp et al. .................. | 370/411 |
| 5,634,099 A | | 5/1997 | Andrews et al. ....... | 395/200.07 |
| 5,634,127 A | | 5/1997 | Cloud et al. ................ | 395/680 |
| 5,642,482 A | | 6/1997 | Pardillos .................. | 395/200.2 |
| 5,664,114 A | | 9/1997 | Krech, Jr. et al. ...... | 395/200.64 |
| 5,671,355 A | | 9/1997 | Collins .................... | 395/200.2 |
| 5,678,060 A | | 10/1997 | Yokoyama et al. ......... | 709/212 |
| 5,682,534 A | * | 10/1997 | Kapoor et al. .............. | 709/203 |
| 5,692,130 A | | 11/1997 | Shobu et al. .......... | 395/200.12 |
| 5,699,317 A | | 12/1997 | Sartore et al. ......... | 395/230.06 |
| 5,699,350 A | * | 12/1997 | Kraslavsky ................. | 370/254 |
| 5,701,434 A | | 12/1997 | Nakagawa .................. | 395/484 |
| 5,701,516 A | | 12/1997 | Cheng et al. ............... | 395/842 |
| 5,749,095 A | | 5/1998 | Hagersten ................... | 711/141 |
| 5,751,715 A | | 5/1998 | Chan et al. ................. | 370/455 |
| 5,752,078 A | | 5/1998 | Delp et al. .................. | 395/827 |
| 5,758,084 A | | 5/1998 | Silverstein et al. .... | 395/200.58 |
| 5,758,089 A | | 5/1998 | Gentry et al. .......... | 395/200.64 |
| 5,758,186 A | | 5/1998 | Hamilton et al. ........... | 395/831 |
| 5,758,194 A | | 5/1998 | Kuzma ....................... | 395/886 |
| 5,768,618 A | * | 6/1998 | Erickson et al. ............... | 710/9 |
| 5,771,349 A | | 6/1998 | Picazo, Jr. et al. ...... | 395/188.01 |
| 5,778,013 A | | 7/1998 | Jedwab ....................... | 714/807 |
| 5,790,804 A | | 8/1998 | Osborne ................ | 395/200.75 |
| 5,794,061 A | | 8/1998 | Hansen et al. ......... | 395/800.01 |
| 5,802,580 A | | 9/1998 | McAlpice ................... | 711/149 |
| 5,809,328 A | | 9/1998 | Nogales et al. ............. | 395/825 |
| 5,812,775 A | | 9/1998 | Van Seeters et al. ... | 395/200.43 |
| 5,815,646 A | | 9/1998 | Purcell et al. ............... | 395/163 |
| 5,828,835 A | * | 10/1998 | Isfeld et al. ................ | 709/200 |
| 5,878,225 A | | 3/1999 | Bilansky et al. ........ | 395/200.57 |
| 5,913,028 A | | 6/1999 | Wang et al. ........... | 395/200.33 |
| 5,930,830 A | | 7/1999 | Mendelson et al. ......... | 711/171 |
| 5,931,918 A | | 8/1999 | Row et al. .................. | 709/300 |
| 5,935,205 A | | 8/1999 | Murayama et al. ......... | 709/216 |
| 5,937,169 A | | 8/1999 | Connery et al. ......... | 395/200.8 |
| 5,941,969 A | | 8/1999 | Ram et al. .................. | 710/128 |
| 5,941,972 A | | 8/1999 | Hoese et al. ................ | 710/129 |
| 5,950,203 A | | 9/1999 | Stakuis et al. ................ | 707/10 |
| 5,970,804 A | | 10/1999 | Osborne ................ | 395/200.75 |
| 5,987,022 A | * | 11/1999 | Geiger et al. ............... | 370/349 |
| 5,991,299 A | * | 11/1999 | Radogna et al. ............ | 370/392 |
| 5,996,024 A | | 11/1999 | Blumenau ................... | 709/301 |
| 6,005,849 A | | 12/1999 | Roach et al. ................ | 370/276 |
| 6,009,478 A | | 12/1999 | Panner et al. ................... | 710/5 |
| 6,016,513 A | | 1/2000 | Lowe ......................... | 709/250 |
| 6,021,446 A | | 2/2000 | Gentry, Jr. .................. | 709/303 |
| 6,026,452 A | | 2/2000 | Pitts ............................. | 710/56 |
| 6,034,963 A | | 3/2000 | Minami et al. ............. | 370/401 |
| 6,038,562 A | | 3/2000 | Anjur et al. ................... | 707/10 |
| 6,044,438 A | | 3/2000 | Olnowich ................... | 711/130 |
| 6,047,356 A | | 4/2000 | Anderson et al. ........... | 711/129 |
| 6,057,863 A | | 5/2000 | Olarig ........................ | 345/520 |
| 6,061,368 A | | 5/2000 | Hitzelberger ............... | 370/537 |
| 6,065,096 A | | 5/2000 | Day et al. .................... | 711/114 |
| 6,070,200 A | | 5/2000 | Gates et al. ................... | 710/20 |
| 6,078,564 A | * | 6/2000 | Lakshman et al. .......... | 370/235 |
| 6,078,733 A | * | 6/2000 | Osborne ..................... | 709/250 |
| 6,101,555 A | | 8/2000 | Goshey et al. .............. | 709/321 |
| 6,141,705 A | | 10/2000 | Anand et al. ................. | 710/15 |
| 6,145,017 A | | 11/2000 | Ghaffari ......................... | 710/5 |
| 6,157,955 A | | 12/2000 | Narad et al. ................ | 709/228 |
| 6,172,980 B1 | | 1/2001 | Flanders et al. ............ | 370/401 |
| 6,173,333 B1 | | 1/2001 | Jolitz et al. | |
| 6,181,705 B1 | * | 1/2001 | Branstad et al. ............ | 370/412 |
| 6,202,105 B1 | | 3/2001 | Gates et al. ................... | 710/20 |
| 6,226,680 B1 | | 5/2001 | Boucher et al. ............ | 709/230 |
| 6,246,683 B1 | | 6/2001 | Connery et al. ............ | 370/392 |
| 6,247,060 B1 | | 6/2001 | Boucher et al. ............ | 709/238 |
| 6,279,051 B1 | | 8/2001 | Gates et al. ................... | 710/20 |
| 6,298,403 B1 | | 10/2001 | Suri et al. ................... | 710/100 |
| 6,334,153 B1 | | 12/2001 | Boucher et al. ............ | 709/230 |
| 6,345,301 B1 | | 2/2002 | Burns et al. ................ | 709/230 |
| 6,356,951 B1 | | 3/2002 | Gentry, Jr. .................. | 709/250 |
| 6,389,468 B1 | | 5/2002 | Muller et al. ............... | 709/226 |
| 6,389,479 B1 | | 5/2002 | Boucher ..................... | 709/243 |
| 6,421,742 B1 | | 7/2002 | Tillier ........................... | 710/1 |
| 6,427,169 B1 | | 7/2002 | Elzur ......................... | 709/224 |
| 6,434,651 B1 | | 8/2002 | Gentry, Jr. .................. | 710/260 |
| 6,449,656 B1 | | 9/2002 | Elzur et al. ................. | 709/236 |
| 6,453,360 B1 | | 9/2002 | Muller et al. ............... | 709/250 |
| 6,473,425 B1 | * | 10/2002 | Bellaton et al. ............. | 370/392 |
| 6,480,489 B1 | | 11/2002 | Muller et al. ............... | 370/389 |
| 6,487,202 B1 | * | 11/2002 | Klausmeier et al. ..... | 370/395.1 |
| 6,526,446 B1 | | 2/2003 | Yang et al. ................. | 709/230 |
| 6,965,941 B1 | * | 11/2005 | Boucher et al. ............ | 709/230 |
| 2001/0004354 A1 | | 6/2001 | Jolitz | |
| 2001/0013059 A1 | | 8/2001 | Dawson et al. ............. | 709/217 |
| 2001/0014892 A1 | | 8/2001 | Gaither et al. .............. | 707/200 |
| 2001/0014954 A1 | | 8/2001 | Purcell et al. ................. | 714/4 |
| 2001/0025315 A1 | | 9/2001 | Jolitz | |
| 2001/0048681 A1 | | 12/2001 | Bilic et al. .................. | 370/389 |
| 2001/0053148 A1 | | 12/2001 | Bilic et al. .................. | 370/389 |
| 2002/0073223 A1 | * | 6/2002 | Darnell et al. .............. | 709/232 |
| 2003/0066011 A1 | | 4/2003 | Oren .......................... | 714/758 |
| 2003/0110344 A1 | * | 6/2003 | Szczepanek et al. ........ | 711/100 |
| 2003/0165160 A1 | | 9/2003 | Minami et al. ............. | 370/466 |

FOREIGN PATENT DOCUMENTS

| | | |
|---|---|---|
| WO | WO/98/50852 | 11/1998 |
| WO | WO/99/04343 | 1/1999 |
| WO | WO 99/65219 | 12/1999 |
| WO | WO 00/13091 | 3/2000 |
| WO | WO 01/04770 A2 | 1/2001 |
| WO | WO 01/05107 A1 | 1/2001 |
| WO | WO 01/05116 A2 | 1/2001 |
| WO | WO 01/05123 A1 | 1/2001 |
| WO | WO 01/40960 A1 | 6/2001 |

OTHER PUBLICATIONS

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages. Sep. 30-Oct. 3, 1990.

Chesson et al., IEEE Syposium Record entitled, "The Protocol Engine Chipset", from Hot Chips III, 16 pages, Aug. 26-27, 1991.
Maclean et al., IEEE Global Telecommunications Conference, Globecom '91, presentation entitled, "An Outboard Processor for High Performance Implementation of Transport Layer Protocols", 7 pages, Dec. 2-5, 1991.
Ross et al., IEEE article entitled "FX1000: A high performance single chip Gigabit Ethernet NIC", from Compcon '97 Proceedings, 7 pages, Feb. 23-26, 1997.
Strayer et al., "Ch. 9: The Protocol Engine" from XTP: The Transfer Protocol, 12 pages, Jul. 1992.
Publication entitled "Protocol Engine Handbook", 44 pages, Oct. 1990.
Koufopavlou et al., IEEE Global Telecommunications Conference, Globecom '92, presentation entitled, "Parallel TCP for High Performance Communication Subsystems", 7 pages, Dec. 6-9, 1992.
Lilienkamp et al., Publication entitled "Proposed Host-Front End Protocol", 56 pages, Dec. 1984.
Article from Rice University entitled "LRP: A New Network Subsystem Architecture for Server Systems", by Peter Druschel and Gaurav Banga, Rice University, Oct. 1996, 15 pages.
Internet RFC/STD/FYI/BCP Archives articles with heading "RFC2140" entitled "TCP Control Block Interdependence", web address http://www.faqs.org/rfcs/rfc2140.html, 9 pages, printed Sep. 20, 2002.
Form 10-K for Exelan, Inc., for the fiscal year ending Dec. 31, 1987 (10 pages).
Form 10-K for Exelan, Inc., for the fiscal year ending Dec. 31, 1988 (10 pages).
Internet pages entitled "Hardwa re Assisted Protocol Processing", (which Eugene Feinberg is working on), 1 page, printed Nov. 25, 1998.
Zilog product Brief entitled "Z85C30 CMOS SCC Serial Communication Controller", Zilog Inc., 3 pages, 1997.
Internet pages of Xpoint Technologies, Inc. entitled "Smart LAN Work Requests", 5 pages, printed Dec. 19, 1997.
Internet pages entitled: Asante and 100BASE-T Fast Ethernet. 7 pages, printed May 27, 1997.
Internet pages entitled: A Guide to the Paragon XP/S-A7 Supercomputer at Indiana University. 13 pages, printed Dec. 21, 1998.
Richard Stevens, "TCP/IP Illustrated, vol. 1, The Protocols", pp. 325-326 (1994).
Internet pages entitled: Northridge/Southbridge vs. Intel Hub Architecture, 4 pages, printed Feb. 19, 2001.
Gigabit Ehternet Technical Brief, Achieving End-to-End Performance. Alteon Networks, Inc., First Edition, Sep. 1996.
Internet pages directed to Technical Brief on Alteon Ethernet Gigabit NIC technology, www.alteon.com, 14 pages, printed Mar. 15, 1997.
VIA Technologies, Inc. article entitled "VT8501 Apollo MVP4", pp. i-vi, 1-11, cover and copyright page, revision 1.3, Feb. 1, 2000.
iReady News Archives article entitled "iReady Rounding Out Management Team with Two Key Executives", http://www.ireadyco.com/archives/keyexec.html, 2 pages, printed Nov. 28, 1998.
"Toshiba Delivers First Chips to Make Consumer Devices Internet-Ready Based on iReady's Design," Press Release Oct. 1998, 3 pages, printed Nov. 28, 1998.
Internet pages from iReady Products, web sitehttp://www.ireadyco.com/products,html, 2 pages, downloaded Nov. 25 1998.
iReady News Archives, Toshiba, iReady shipping Internet chip, 1 page, printed Nov. 25, 1998.
Interprophet article entitled "Technology", http://www.interprophet.com/technology.html, 17 pages, printed Mar. 1, 2000.
iReady Corporation, article entitled "The I-1000 Internet Tuner", 2 pages, date unknown.
iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.
iReady News Archive article entitled "Seiko Instruments Inc. (SII) Introduces World's First Internet-Ready Intelligent LCD Modules Based on IReady Technology," Santa Clara, CA and Chiba, Japan, Oct. 26, 1998. 2 pages, printed Nov. 2, 1998.
NEWSwatch article entitled "iReady internet Tuner to Web Enable Devices", Tuesday, Nov. 5, 1996, printed Nov. 2, 1998.
EETimes article "Tuner for Toshiba, Toshiba Taps iReady for Internet Tuner", by David Lammers, 2 pages, printed Nov. 2, 1998.
"Comparison of Novell Netware and TCP/IP Protocol Architectures", by J.S. Carbone, 19 pages, printed Apr. 10, 1998.
Adaptec article entitled "AEA-7110C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
U.S. Appl. No. 60/053,240, filed, Jul. 18, 1997, Jolitz et al.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transaactions on Networking, vol. 6, No. 6, Dec. 1998.
IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998.
U.S. Appl. No. 08/964,304, by Napolitano, et al., entitled "File Array Storage Architecture", filed Nov. 4, 1997.
"File System Design For An NFS File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.
Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Botttleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printer Jun. 5, 1997.
Jato Technologies article entitled Network Accelerator Chip Architecture, twelve-slide presentation, printed Aug. 19, 1998.
EETimes article entitled Enterprise System Uses Flexible Spec, dated Aug. 10, 1998, printed Nov. 25, 1998.
Internet pages entitled "Smart Ethernet Network Interface Cards", which Berend Ozceri is developing, printed Nov. 25, 1998.
Internet pages of Xaqti corporation entitled "GigaPower Protocol Processor Product Review," printed Nov. 25, 1998.
Internet pages entitled "DART: Fast Application Level Networking via Data-Copy Avoidance," by Robert J. Walsh, printed Jun. 3, 1999.
Internet pages of InterProphet entitled "Freuently Asked Questions", by Lynne Jolitz, printed Jun. 14, 2000.
Internet pages entitled iReady Products, printed Nov. 25, 1998.
Andrew S. Tanenbaum, Computer Networks, Third Edition, 1996, ISBN 0-13-349945-6, (entire book).

* cited by examiner

TEMPLATE HEADER FORMAT

FIG. 3

```
/*---------------------- BEGINNING OF CODE THAT DOES ACK TX PROCESSING -------------*/

AX_DAP:                 /***** AX_DAP *****/
        /*
         * DO ACK PROCESSING.
         *
         * THE RCV DELACK TIMER HAS EXPIRED.
         * FORMAT AND SEND AN ACK.
         */

/* TI_LENL6       EQU     L6                                              */
        /* LNBPL8         EQU     L8      LARGE INIC BUFFER PTR                   */
        /* TCP_CSUML11    EQU     L11                                             */
        /* SYS_SCR        EQU     SYS_SCR                                         */

/* GET A DRAM BUFFER TO PUT PCI PAYLOAD IN                                */
        JSR     GETLDBUF;                       /* (LNBPL8)             */
        TEST    LNBPL8, JCF ZERO DAP0_1;        /* GO ON IF GOT A BUFFER */
        /* NO BUFFER - SEND EVENT AND TRY LATER    */
        MOVE    GR0 EX_SACKC,
        JSR     SETOPEVNT;                      /* (THWD0L12)           */
        JMP     XFSM_EXIT;

DAP0_1:
        /* SETUP CANNED HEADER. */
        CLR     TI_LENL6,
        JSR     SETCANNEDHDDR;   /* (TI_LENL6, TOTLENL10, TCP_CSUML11) */

/* DMA TEMPLATE HDDR FROM SRAM TO DRAM BUFFER */
        /* SET   CHKSUM INTO HEADER */

ADDL    ADDR_REGB TCBSRAML5 STCB_TEMPLATE+TPL_TCPCSUM|ADDR15;

/* READ TEMPLATE HEADER FROM SRAM */
        ANDL    SYS_SCR TCP_CSUML11 H'FFFF';
        SHFTR   TCP_CSUML11 C16, LIT_TO_ADDR_REGA STCB_TCPCB+TCB_SHFLAGS;
        ADD     TCP_CSUML11 SYS_SCR, JCF ALU_B16 '$ + 2';
        INCR    TCP_CSUML11;                            /* ADD IN CARRY    */
        BTEST   SRAM1 TSF_VLANC, JCT ZERO '$ + 2';      /* GO NO VLAN TAG */
```

FIG. 4A

```
ADD     ADDR_REGB VLAN_TAG_SZEC;
XOR     TCP_CSUML11 MINUS_1, WSRAM2_XPOSE;

/*
 * SET    FRAME LEN INTO TEMPLATE HEADER FOR MAC SEQR.
 * FRAMELEN = TEMPLATE HDR LEN - 2
 */

MOVEL   ADDR_REGA STCB_TEMPLATE+TPL_TMPLTLEN;
/* POINT TO TEMPLATE LENGTH */
MOVE    CR0 SRAM2, LIT_TO_ADDR_REGB STCB_XMTBYTCNT;
COMP    CR0 MIN_FRAME_LEN, JCT LT '$ + 3';

/* MAKE SURE FRAME IS MIN LENGTH */
SUBL    NULL CR0 XMT_HDDR_SIZE_SRAM, WSRAM4;        /* TEMPLATE HDR - 2 */
JMP     '$ + 2';
MOVEL   SRAM4 ETHER_MIN_TU;      /* MIN ETHER FRAME LEN = 60 (+CRC) */
ADD     CR0 SIZEOF_XMITHDR+7C; /* PREPARE TO ROUNDUP XFER SIZE */
MOVE    RAM_BASE PDDSCPTR, LIT_TO_ADDR_REGB DMA_CMD_WD;
ANDNL   SRAM4+ CR0 H'3';

/* PDES->IXFR_SZ ROUNDED TO 8-BYTE BNDRY */
MOVE    SRAM4+ LNBPL8;                              /* PDES->DST_ADDR = */
ADDL    SRAM4 TCBSRAML5 STCB_XMIT_BUFFER;  /* PDES->SRC_ADDR = */

/* XXXDMA ORL CH_CMD CTXT_RPROC CCR_S2D;  */
/* SET UP TO DMA THE ACK FROM SRAM TO DRAM */
MOVE    Q_CTRL Q_S2DC;                              /* SELECT S2D DMA */
MOVE    Q_DATA PDDSCPTR;
JCF     Q_OP_DONE '$ - 1';
MOVE    CTXT_RTNADL14 PC, JMP PROC_SUSPEND;         /* SUSPEND */
MOVE    RAM_BASE TCBSRAML5;                         /* RESUME */
```

FIG. 4B

```
        /* SET EVENT WD FOR XMT Q */
        BSET    LNBPL8 XMT_TCPIPC;
        MOVE    Q_CTRL Q_XMTPRI1C;
        /* WRITE INTO QUEUE CONTROL REGISTER TO INDICATE THE PRIORITY   */
        /* TRANSMIT QUEUE.                                              */

DAP0_2:
        MOVE    Q_DATA LNBPL8;
        /* WRITE A POINTER (TO THE ACK NOW IN DRAM) INTO QUEUE DATA REGISTER. */
        /* THIS WRITE CAUSES THE POINTER TO BE PUSHED ONTO THE INDICATED      */
        /* PRIORITY TRANSMIT QUEUE.                                           */
        CLR     ISRL2, JCT Q_OP_DONE DAP0_3;        /* JUMP IF Q'D OK */
        BTEST   Q_FULL Q_XMTPRI1C, JCT ZERO DAP0_2;

DAP0_2A:
        /* DROP FRAME */
        ORL     FRADDL0 LNBPL8 2KB_SMSK;
        JSR     FREELDBUF;                          /* (FRADDL0) */
        JMP     XFSM_EXIT;

DAP0_3:
        BCLR    THWD0L12 HE_RDLACKC,
        JMP     XFSM_EXIT;

/*------------------------- END OF CODE THAT DOES ACK TX PROCESSING -------------*/
```

KEY TO FIG. 4

TCP/IP OFFLOAD DEVICE WITH FAST-PATH TCP ACK GENERATING AND TRANSMITTING MECHANISM

CROSS-REFERENCE TO RELATED APPLICATIONS

This application claims the benefit under 35 U.S.C. §120 of U.S. patent application Ser. No. 09/464,283, filed Dec. 15, 1999, which in turn claims the benefit under 35 U.S.C. §120 of U.S. patent application Ser. No. 09/439,603, filed Nov. 12, 1999, which in turn: 1) claims the benefit under 35 U.S.C. §120 of U.S. patent application Ser. No. 09/067,544, filed Apr. 27, 1998, and 2) claims the benefit under 35 U.S.C. §119(e)(1) of Provisional Application Ser. No. 60/061,809, filed Oct. 14, 1997.

This application also claims the benefit under 35 U.S.C. §120 of U.S. patent application Ser. No. 09/384,792, filed Aug. 27, 1999, which in turn claims the benefit under 35 U.S.C. §119(e)(1) of Provisional Application Ser. No. 60/098,296, filed Aug. 27, 1998.

This application also claims the benefit under 35 U.S.C. §120 of U.S. patent application Ser. No. 09/802,426, filed Mar. 9, 2001. The subject matter of all of the above-identified patent applications (including the subject matter in the Microfiche Appendix of U.S. application Ser. No. 09/464,283), and of the two above-identified provisional applications, is incorporated by reference herein.

CROSS REFERENCE TO COMPACT DISC APPENDIX

The Compact Disc Appendix, which is a part of the present disclosure, includes a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BRIEF DESCRIPTION OF THE DRAWINGS

The present invention is illustrated by way of example and not limitation in the figures of the accompanying drawings, in which.

DETAILED DESCRIPTION

Figure 1:
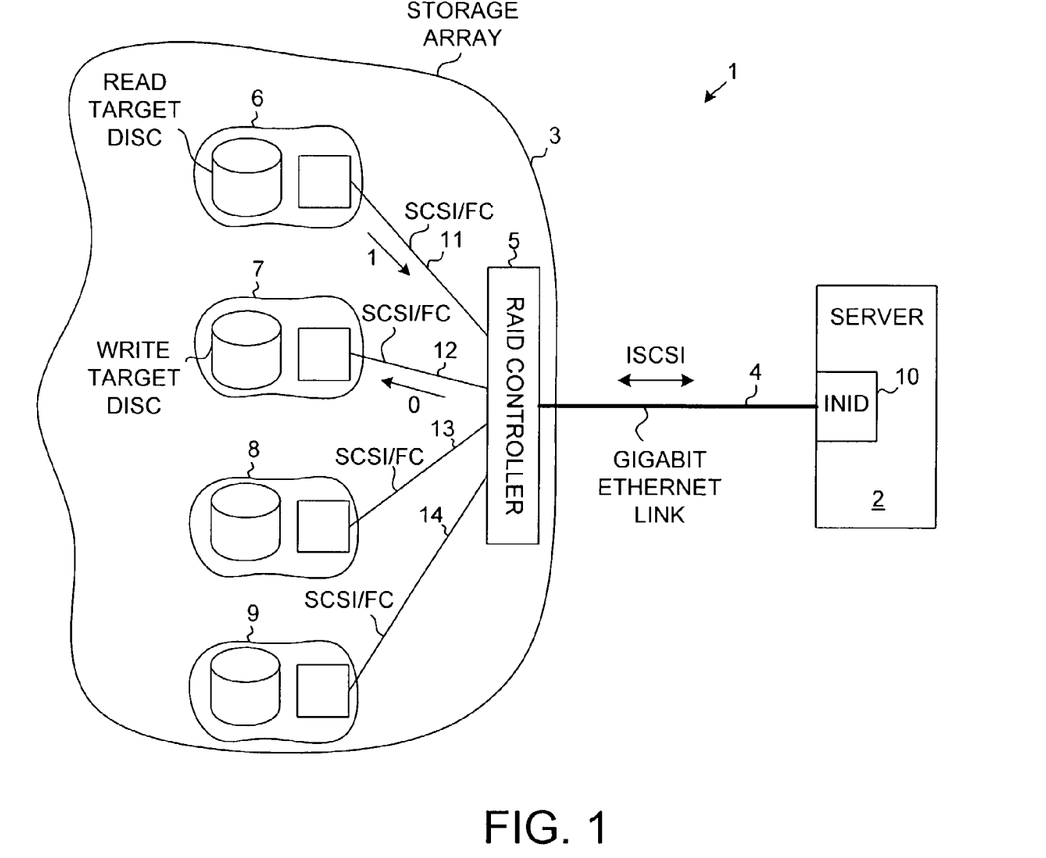
FIG. 1 is a diagram of a network data communication system in accordance with one embodiment of the present invention.

FIG. 1 is a diagram of one particular network system 1 in which the present invention operates. The present invention may, however, operate in numerous other systems. The system 1 of FIG. 1 is set forth as one example only.

System 1 includes a first device 2 (in this case, a server) that both receives data from and transmits data to a second device 3 (in this case, a storage array) via a high-speed bidirectional full-duplex network link 4. Bidirectional network link 4 employs one particular transport layer protocol and one particular network layer protocol. In the present example, the transport layer protocol is the TCP protocol, the network layer protocol is the IP protocol, and bidirectional network link 4 is a gigabit ethernet network connection. Storage array 3 in this example includes a RAID controller 5 and a plurality of disc devices 6–9. Disc devices 6–9 are coupled via Small Computer System Interface (SCSI) links or Fibre Channel (FC) links 11–14 to the RAID controller. Relatively large amounts of network information pass over gigabit ethernet link 4 in accordance with the IP Storage protocol (also called "ISCSI") both from storage array 3 and to server 2 as well as from server 2 and to storage array 3.

Server 2 is coupled to gigabit link 4 by an intelligent network interface device (INID) 10. For additional information on INID 10, see U.S. patent application Ser. No. 09/464,283 (the subject matter of which is incorporated herein by reference). Server 2 and INID 10 together perform protocol processing such that ISCSI communications received from ethernet link 4 may be processed by an ethernet MAC protocol processing layer, by an IP protocol processing layer, by a TCP protocol processing layer, and by an ISCSI protocol processing layer. Similarly, ISCSI communications output from server 2 onto ethernet link 4 may be processed by the ISCI protocol processing layer, by the TCP protocol processing layer, by the IP protocol processing layer, by the ethernet MAC protocol processing layer and are then output onto the ethernet link. For network communications where a particular set of transport layer, network layer, and MAC layer protocols is used, INID 10 accelerates network communication by using dedicated accelerator hardware on INID 10 to speed protocol processing. INID 10 is therefore said to perform TCP/IT) offload functions for server 2.

In the present example, the particular set of protocols is the TCP protocol, the IP protocol, and the ethernet protocol. It is to be understood, however, that the particular set of transport, network, and MAC layer protocols may be different in another example. A packet whose transport layer protocol is the TCP protocol and whose network layer protocol is the IP protocol is called a TCP/IP packet. Generally speaking, the term "transport layer" as it is used here identifies that layer of the protocol stack that a TCP layer would be classified into, the term "network layer" as it is used here identifies that layer of the protocol stack that an IP layer would be classified into, and the term "MAC layer" as it is used here identifies that layer of the protocol stack directly beneath the network layer.

Figure 2:
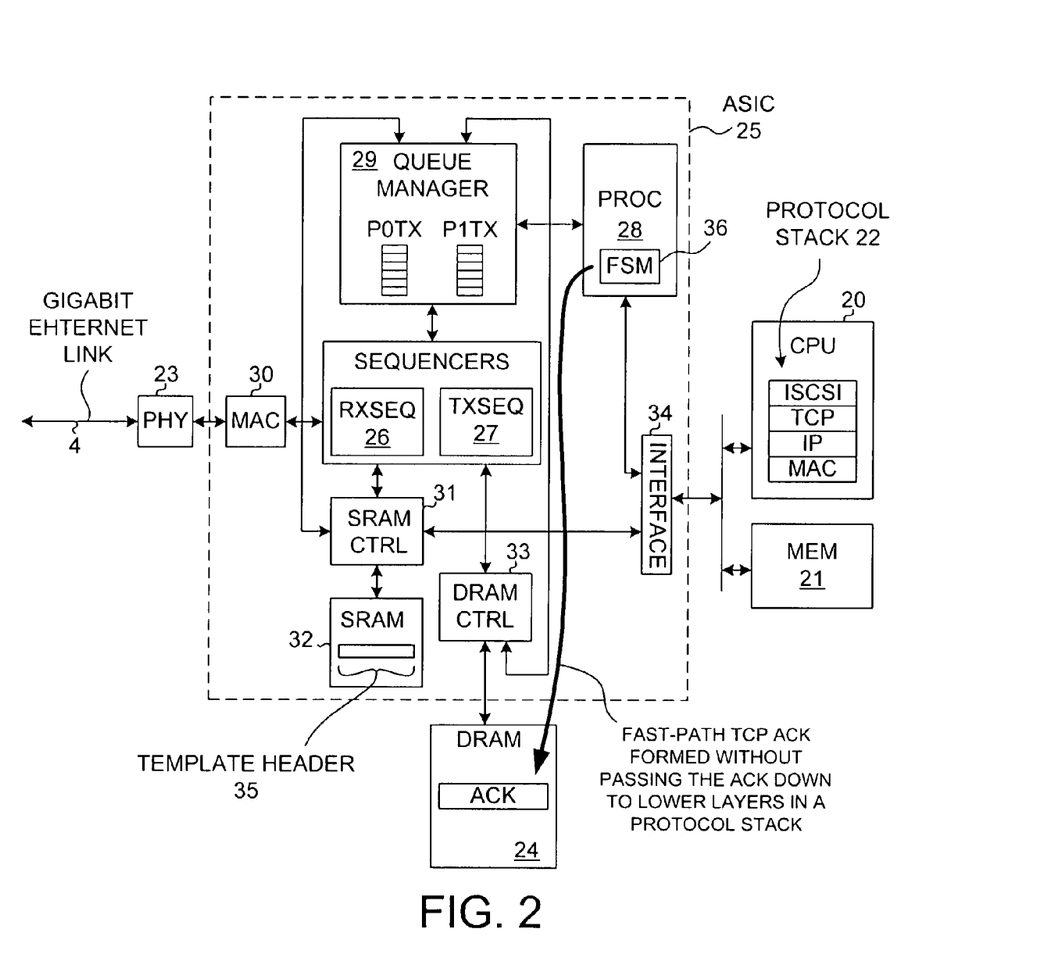
FIG. 2 is a simplified block diagram of the intelligent network interface device (INID) of FIG. 1.

FIG. 2 is a simplified block diagram that illustrates TCP/IP offloading performed by INID 10. A CPU 20 executes protocol stack software stored in memory 21. The protocol stack is illustrated as stack 22 involving a MAC layer, an IP layer, a TCP layer, and an ISCSI layer. It is to be understood that CPU 20 and stack 22 are part of INID 10 where the INID 10 is coupled to another processor of server 2, or alternatively CPU 20 and stack 22 are part of the remainder of server 2 to which INID 10 is coupled. In either case, stack 22 performs a significant amount (in some cases, substantially all) of the TCP/IP protocol processing under certain infrequently occurring and/or complex situations (this relatively slow protocol processing path is called the "slow-path"), whereas the dedicated accelerator portion of INID 10 performs substantially all TCP/IP protocol processing under the remaining situations (this relatively fast protocol processing path is called the "fast-path"). Infrequently occurring situations include, in one particular example, situations in which TCP packets are received out of sequence.

In the embodiment of FIG. 2, the dedicated accelerator hardware of INID 10 includes a physical layer interface 23, a DRAM 24, and a specially-designed integrated circuit 25. Integrated circuit 25 includes a receive sequencer 26, a transmit sequencer 27, a processor 28, a queue manager 29, MAC interface circuitry 30, an SRAM controller 31, an SRAM 32, a DRAM controller 33, and a bus interface 34. Processor 28 executes code stored in a control store portion of SRAM 32. Transmit sequencer 27 executes instructions that are hardcoded into integrated circuit 25. Processor 28 may, in certain embodiments, actually include three processors: a transmit processor, a receive processor, and a utility processor. For additional information on integrated circuit 25 and its operation, see U.S. patent application Ser. No. 09/464,283 (the subject matter of which is incorporated herein by reference).

In the example of FIG. 1, a data transfer of an ISCSI read reply from read target disc 6 occurs at the same time that a data transfer of an ISCSI write to write target disc 7 occurs. The ISCSI read reply causes data on read target disc 6 to pass across SCSI/FC link 11 to RAID controller 5 and across gigabit ethernet link 4 and into INID 10. The data passes over a first TCP/IP connection (denoted in FIG. 1 as connection "1") that is established for this purpose. A flow of TCP packets (sometimes called "frames") is received onto INID 10 via physical layer interface (PHY) 23, MAC interface 30, and receive sequencer 26.

Receive sequencer 26 performs initial processing on each TCP packet, validates packet headers, generates a lookup hash from the TCP and IP headers of the packet, and determines whether the packet meets certain "fast-path candidate" criteria. For example, only packets having the particular set of transport layer protocol and network layer protocol may be handled via the fast-path. If the receive sequencer 26 determines from the headers of the packet that the packet does not fit these fast-path candidate criteria, then receive sequencer 26 sets an attention bit to a one indicating that the packet is not a "fast-path candidate". If on the other hand the packet fits the criteria, then receive sequencer 26 sets the attention bit to a zero indicating that the packet is a "fast-path candidate".

Receive processor 26 is called a "fly-by sequencer" because it analyzes the incoming packet on-the-fly as the packet is being received rather than putting the packet into a separate memory and then later retrieving the packet from the separate memory and performing the analysis using a more general purpose processor. The incoming packet information is placed into a buffer in DRAM 24 and a "receive descriptor" is pushed onto a "receive descriptor queue" (not shown) maintained by queue manager 29. The "receive descriptor" includes both the attention bit and a pointer (or set of pointers) that points to the buffer in DRAM 24.

Processor 28 pops the receive descriptor queue, obtains the pointer (or pointers) and the attention bit, and retrieves the associated packet information from DRAM 24. If the attention bit is set to a zero indicating that the packet is a "fast-path candidate", then processor 28 performs additional checking to determine whether the packet is in fact a "fast-path packet" that will be handled using the fast-path. There are a plurality of TCP/IP connections, communications for which are handled by INID 10 using the fast-path.

Processor 28 uses the hash made by receive sequencer 26 to determine if the TCP/IP connection of the packet is one of the TCP/IP connections handled in fast-path (for example, by identifying the packet with a context or a communication control block (CCB)). If the connection of the packet is determined to be one of the fast-path connections, then processor 28 performs the additional step of checking for one of numerous exception/error conditions that are not to be handled via the fast-path. One example of an exception condition is the packet having a TCP sequence number that is out of order. If processor 28 finds no exception/error condition, then the packet is determined to be a "fast-path packet". For additional information on the how a packet is determined to be a "fast-path packet" in one embodiment, see: 1) U.S. patent application Ser. No. 09/464,283, and 2) U.S. patent application Ser. No. 09/384,792 (the subject matter of these two applications is incorporated herein by reference).

Once the received packet is determined to be a "fast-path packet", processor 28 causes the data portion of the packet to be written into a destination in memory 21. In this way, the data portions of each successive TCP/IP packet of the ISCSI read reply is written into the destination so that the destination contains a single block of data without any TCP or IP headers. The ISCSI layer of stack 22 can then access the block of ISCSI data in memory 21 without CPU 20 and stack 22 having to perform TCP or IP protocol processing on the incoming TCP/IP packets.

At the same time that this fast-path ISCSI read is occurring, the data transfer of the ISCSI write is occurring. Data for the ISCSI write also passes through INID 10 via the fast-path. The file system of CPU 20 places data into a particular location in memory 21. This data is then transferred to DRAM 24 by a DMA controller (not shown) of integrated circuit 25. Processor 28 sections this data up and causes it to be transmitted onto ethernet link 4 as a plurality of TCP/IP packets. Processor 28 forms the header of each TCP/IP packet and merges that header with its data so that a complete packet exists in a buffer DRAM 24.

Processor 28 then pushes a pointer to that buffer onto a transmit queue P0TX maintained by queue manager 29. In accordance with one embodiment, there is a queue control register and a data register associated with transmit sequencer 27. The low priority queue P0TX is identified by a first identifying five-bit queue ID value present in a first five-bit field XmtQId of the queue control register (XmtCfg). The higher priority queue PITX is identified by a second identifying five-bit queue ID value present in a second five-bit field PriQId of the queue control register (XmtCfg). Use of the two priority transmit queues is enabled by writing a one into a one-bit field PriQEn of the queue control register (XmtCfg). To accomplish the push, processor 28 first writes an appropriate value to the queue control register (XmtCfg) and then writes the pointer to the queue data register. The second write to the queue data register actually causes the push.

Transmit sequencer 27 then pops the transmit queue P0TX, obtains the pointer, uses the pointer to read the packet information from DRAM 24, and then transmits the packet information from the INID as a TCP/IP packet via MAC 30 and PHY 23. The TCP/IP packets associated with the ISCSI write are communicated via a second TCP/IP connection that is denoted "0" in FIG. 1.

INID 10 transmits TCP/IP packets onto gigabit ethernet link 4 at close to the theoretical unidirectional maximum throughput rate of gigabit ethernet link 4 (1000 megabits per second). In the present example, there are times that INID 10 is not the limiting factor in maintaining throughput rate, and TCP/IP packets for transmission begin to back up in INID 10. Pointers to various TCP/IP packets in DRAM 24 to be transmitted therefore begin to back up in transmit queue P0TX.

Not only does INID 10 output TCP/IP packets at close to the theoretical maximum unidirectional throughput rate of ethernet link 4, but INID 10 also receives TCP/IP packets from link 4 at close to the theoretical unidirectional throughput rate (1000 megabits per second). Under typical conditions, the TCP protocol requires that a receiving device return an acknowledge packet (ACK) back to the transmitting device for every other received TCP packet. The use of ACKs and their associated windows in the TCP protocol prevents the overloading of a receiving device by stopping the transmitting device until the receiving device has caught up.

In the present example where transmission across link 4 into INID 10 occurs at close to the theoretical 1000 megabits per second limit for link 4, transmission across link 4 into INID 10 should not be stopped due to INID 10 not sending back an ACK for a TCP packet received. If ACKs for the incoming data stream of connection "1" were transmitted in normal course via transmit queue P0TX, then pointers to the ACKs for connection "1" would get pushed onto the P0TX transmit queue after pointers to the backed up outbound TCP packets for connection "0".

TCP ACKs associated with the ISCSI read are therefore generated and transmitted with priority using the fast-path. A fast-path ACK for the connection "1" ISCSI read is generated without having to pass the TCP ACK down to a discrete IP protocol layer, and then down to a discrete MAC protocol layer. Such sequential processing of the TCP ACK through a sequence of discrete transport and network protocol processing layers may be slowed because a lower level processing layer (for example, the IP layer) to which the ACK is passed may not be provisioned to give processing priority to the ACK. Accelerating processing through a single layer of protocol processing may therefore not result in the ACK being processed through all the layers with priority. The ACK may therefore not be output from INID 10 as rapidly as is desired.

To avoid such potential sequential protocol processing delay issues, INID 10 employs a template header 35 and a software finite state machine 36 executing on processor 28.

Figure 3:
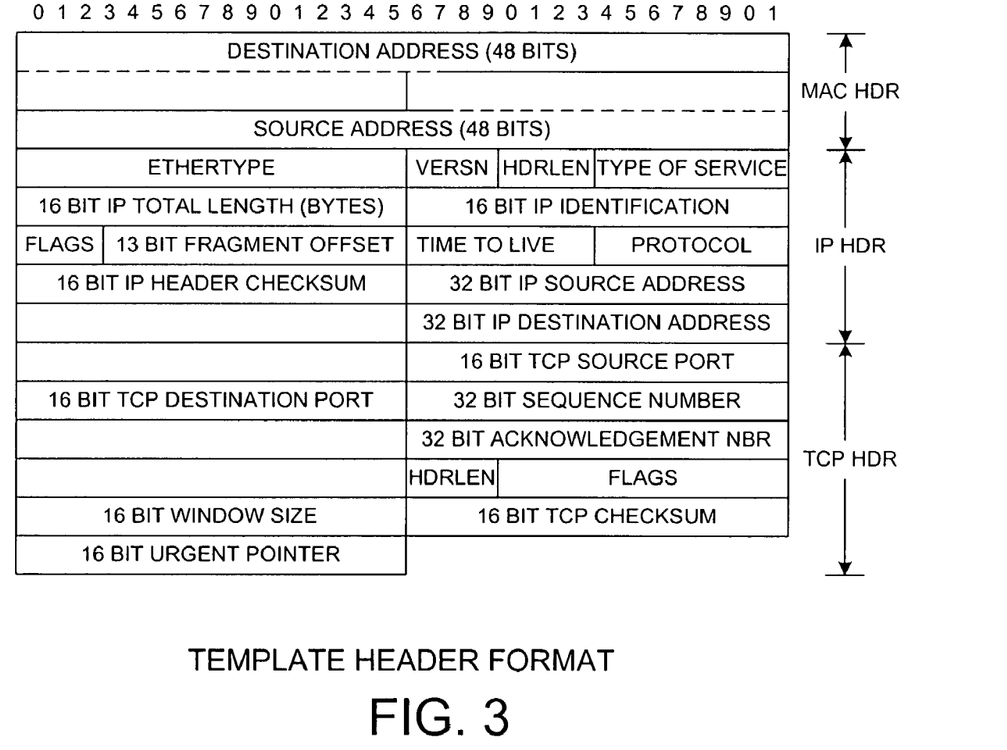
FIG. 3 is a diagram of a template header in accordance with an embodiment of the present invention.

FIG. 3 is a diagram of template header 35. Although considerable detail is set forth here with respect to template header 35, it is to be understood that FIG. 3 sets forth but one example of a template header in accordance with an embodiment of the present invention. Other template header formats can be employed in accordance with the present invention.

Figure 4:
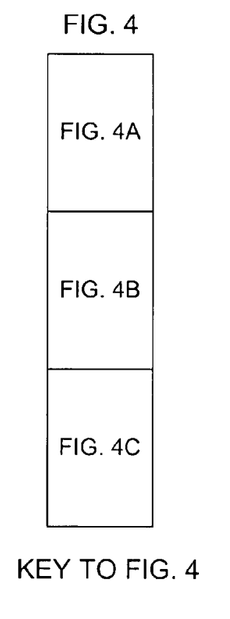
FIG. 4 is a section of code that executes on processor 28 of FIG. 2. The code is for generating ACKs in accordance with an embodiment of the present invention.
Figure 4A:
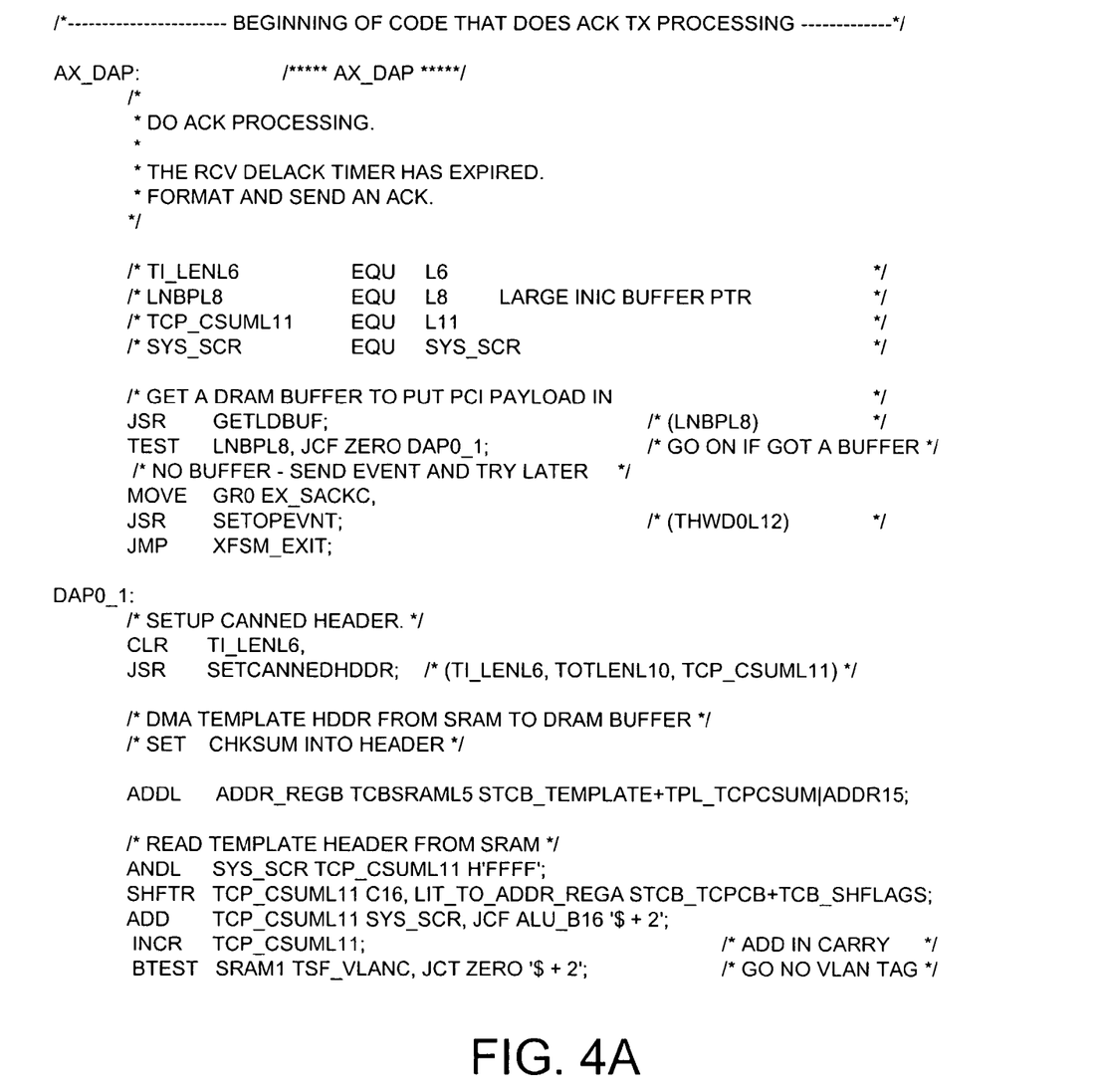
Figure 4B:
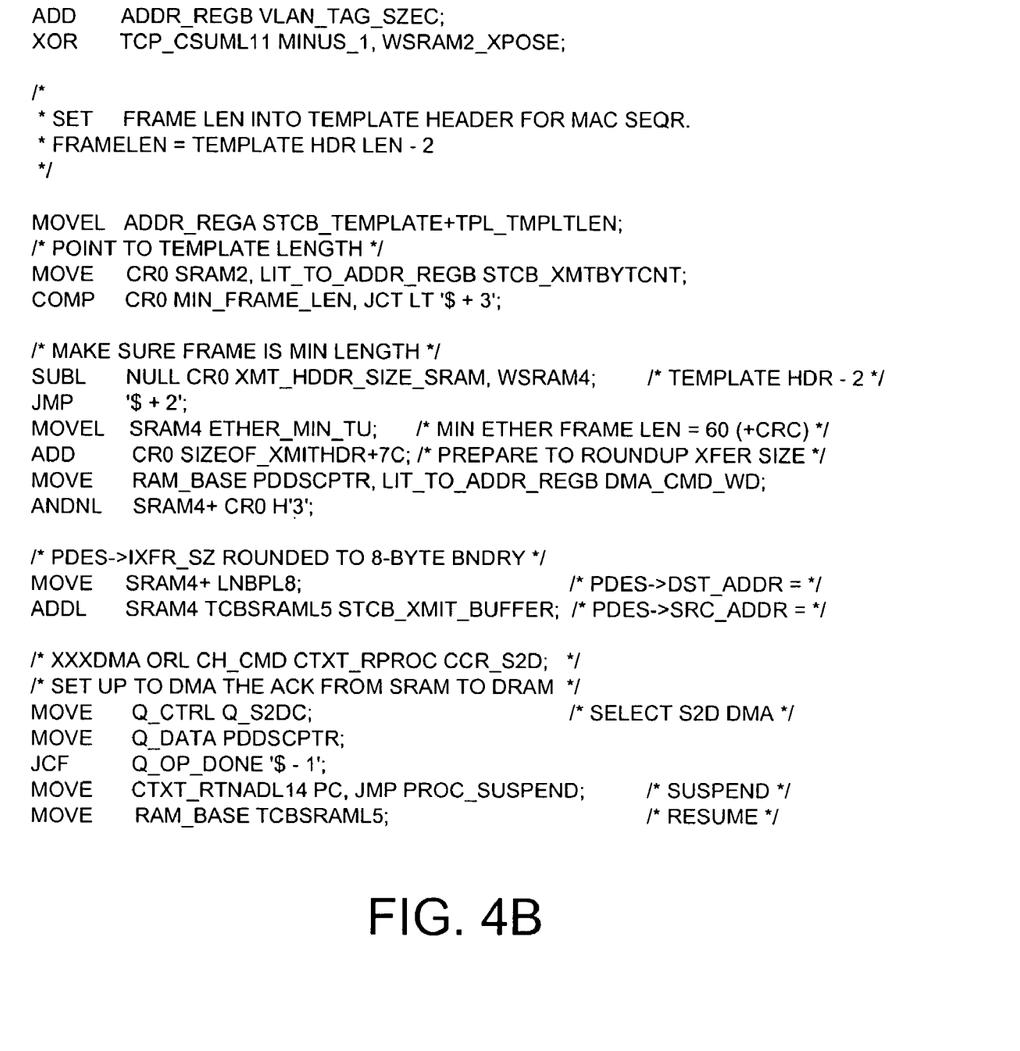
Figure 4C:
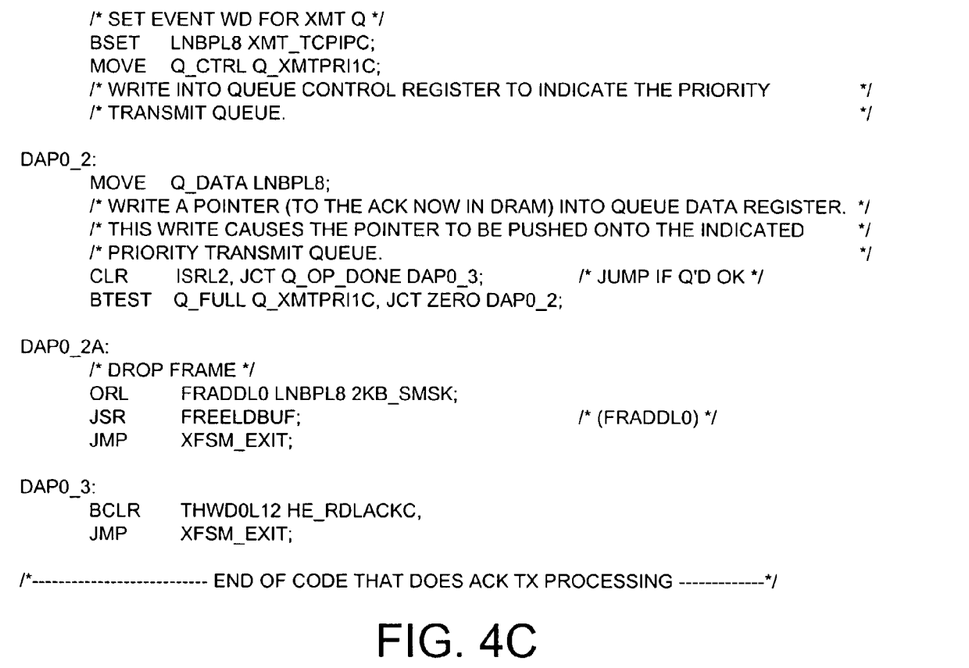

FIG. 4 is a listing of code for software finite state machine (FSM) 36. In the code, "Q_XMTPRIIC" designates a high-priority transmit queue used for ACKs (another lower-priority transmit queue is used to transmit ordinary data packets). The structure and operation of the FSM is evident from the code itself. The functions performed by the various instructions in the code are generally evident from the names of the instructions themselves. For additional information on the instructions, see the description of the instruction set found in Microfiche Appendix B of U.S. patent application Ser. No. 09/464,283 (the subject matter of which is incorporated herein by reference).

Finite state machine 36 covers both TCP and IP protocol processing and thereby "flattens" protocol processing such that the TCP ACK is generated without having to wait for sequential protocol processing of various protocol processing layers. ACKs generated are handed in a fairly direct manner to the hardware interfacing to the physical ethernet link without having to go through separate lower level P and MAC processing layers.

Finite state machine 36 reads template header 35 from SRAM 32. Template header 35 includes various TCP and IP fields that processor 28 and finite state machine 36 fill in. In one embodiment (see FIG. 3), these TCP and IP fields include a sixteen-bit IP Identification field, a sixteen-bit IP header checksum field (where the IP header includes the IP ID), a sixteen-bit IP total length field that indicates the total length of the IP datagram, a thirty-two bit TCP sequence number field, a thirty-two bit ACK number field, a sixteen-bit TCP window size field, a twelve-bit TCP flag field, and a sixteen-bit TCP checksum field. Finite state machine 36 uses information about the connection and the packet received (such as, for example, the TCP source and destination ports and the IP source and destination addresses) to fill in the TCP and IP fields in template header 35. Template header 35 as stored in SRAM 32 may contain partial checksums and/or partial length values that processor 28 uses to determine final checksum values and/or final length values that are filled in. In some embodiments, template header 35 as stored in SRAM 32 already includes the correct TCP source and destination ports and IP source and destination addresses.

Once processor 28 and finite state machine 36 have filled in the TCP and IP fields in the template header, the filled-in template header is transferred to a buffer in DRAM 24. If the ACK is to include a data payload, then the data payload is preloaded into the buffer such that the writing of the template header into the buffer results in the template header being prepended to the front of the data payload. An ACK can, for example, be incorporated into a data packet provided that the data packet is to be transmitted to the appropriate port and address (this is called piggy-backing).

In the case of the fast-path TCP ACK generated in the present example, however, there is no data payload. Once the TCP ACK is in the buffer, processor 28 causes a pointer (or a set of pointers) to the buffer to be pushed onto a high priority transmit queue P1TX. Transmit sequencer 27 is designed to pop a pointer off higher priority transmit queue P1TX in preference to popping a pointer off lower priority transmit queue P0TX. Accordingly, transmit sequencer 27 pops the ACK pointer (or the set of pointers) for connection "1" off transmit queue P1TX before it pops pointers off transmit queue P0TX for outbound connection "0" data. The fast-path TCP ACK for connection "1" is transmitted from INID 10 before any of the backed-up TCP data packets for connection "0".

In this example, the TCP ACK is output from INID 10 before any of the associated data from read target disc 6 is transferred from INID 10 and into the destination in memory 21. (This need not be the case, however. Associated data or some portion of the associated data may be transferred from INID 10 and into the destination in memory 21 before the TCP ACK is output from INID 10.) In the particular example described above, the rate of information transmitted onto ethernet link 4 from INID 10 remains substantially the same but the TCP ACK is transmitted back to the transmitting RAID device earlier, thereby decreasing the amount of time that RAID controller 5 is stopped from transmitting due to the RAID controller 5 not having received connection "1" ACKs. In this example, an ACK is approximately 64 bytes long, whereas a typical data packet is approximately 1500 bytes long. An INID in accordance with an embodiment of the present invention was tested in a Tolly Chariot bidirectional performance test. The INID achieved a 90 megabits per second throughput in both directions on a full-duplex 100 megabits/second link (in a first direction into the INID from the network as well as in a second direction out of the INID and to the network). Bandwidth is maximized and latency is minimized.

In some embodiments, the output of TCP/IP packets is further accelerated by not filling in a checksum field before the TCP/IP packet is loaded into a DRAM buffer, but rather the final checksum is merged into the TCP/IP packet as the packet is being output from INID 10 in accordance with methods set forth in U.S. patent application Ser. No. 09/802,426 (the subject matter of which is incorporated herein by reference). In some embodiments, a destination in memory 21 where the data for the ISCSI read is placed is determined in accordance with methods set forth in U.S. patent application Ser. No. 09/789,366 (the subject matter of which is incorporated herein by reference). Control of a TCP/IP connection can be passed by numerous techniques including, for example, moving a communication control block (CCB) for the connection to the device that is to assume control of the connection, or by maintaining a CCB for the connection in one location and merely transferring ownership of the connection by setting an ownership bit that identifies which device is in control of the CCB and the TCP/IP connection. Techniques set forth in U.S. patent application Ser. No. 09/855,979 (the subject matter of which is incorporated herein by reference) can be practiced in combination with the TCP ACK generating and transmitting mechanisms set forth above. Techniques set forth in U.S. patent application Ser. No. 09/970,124 (the subject matter of which is incorporated herein by reference) can be used to facilitate the executing of solicited session layer read commands (for example, ISCSI read commands) in combination with the TCP ACK generating and transmitting mechanisms set forth above.

The CD Appendix includes the following: 1) folder CPU, 2) folder XCV, 3) folder INCLUDE, 4) file fsma.txt, and 5) file fsms.txt. Folder CPU contains a hardware description of processor 28 in verilog. Folder XCV contains files that start with "xmt" and files that start with "rcv". The "xmt" files are a hardware description of transmit sequencer 27. The "rcv" files are a hardware description of a receive processor that in some embodiments is used in place of and performs the functions of receive sequencer 26. The file that ends in ".mal" is a program of instructions executed by the receive processor described by the verilog code. Folder INCLUDE is a definition file for the verilog code in folders CPU and XCV. The files fsma.txt and fsms.txt together are code for the finite state machine that executes on processor 28. A hardware description in verilog of queue manager 29 is found in U.S. patent application Ser. No. 09/416,925 (the subject matter of which is incorporated herein by reference).

INID 10 may include an input priority mechanism whereby incoming ACKs are receive processed on a higher priority basis than are ordinary incoming data packets. In one embodiment, incoming ACKs are marked for high priority processing by setting three priority 802.1P bits in the VLAN tag header extension in the MAC header of the TCP ACK. The receive sequencer uses these bits to identify the high priority ACK such that a buffer descriptor to the high priority ACK is put onto a high priority receive queue, whereas buffer descriptors for other ordinary incoming packets are put onto a lower priority receive queue.

Although certain specific exemplary embodiments are described above in order to illustrate the invention, the invention is not limited to the specific embodiments. The above-described methods of generating fast-path TCP ACKs are more generally applicable to generating fast-path responses back to transmitting devices. INID 10 can be part of a memory controller integrated circuit or an input/output (I/O) integrated circuit or a bridge integrated circuit of a microprocessor chip-set. In some embodiments, the network interface device is part of an I/O integrated circuit chip such as, for example, the Intel 82801 integrated circuit of the Intel 820 chip set. INID 10 may be integrated into the Intel 82815 Graphics and Memory Controller Hub, the Intel 440BX chipset, or the Apollo VT8501 MVP4 North Bridge chip. Multiple template headers can be used, one for each particular set of transport, network, and MAC protocols that is fast-path processed. Hardcoded receive sequencer 26 is, in some embodiments, replaced with a receive processor that executes instructions stored in static RAM or other suitable memory. The instructions executed by the receive processor are, in some embodiments, downloaded upon power-up of INID 10 into the memory on INID 10, thereby facilitating the periodic updating of receive processor functionality. The high and low priority transmit queues set forth above may be implemented in software or may be implemented in more specialized queue hardware. A hardware queue manager may or may not be used. Similarly, hardcoded transmit sequencer 27 is, in some embodiments, replaced with a transmit processor that executes instructions stored in static RAM or other suitable memory. Accordingly, various modifications, adaptations, and combinations of various features of the described embodiments can be practiced without departing from the scope of the invention as set forth in the following claims.

What is claimed is:

1. A method of outputting a first TCP/IP packet and a second TCP/IP packet from a network interface device, the first TCP/IP packet and the second TCP/IP packet being output to a network, comprising:
    (a) storing first packet information on the network interface device;
    (b) pushing a first pointer to the first packet information onto a first transmit queue of the network interface device;
    (c) storing second packet information on the network interface device;
    (d) pushing a second pointer to the second packet information onto a second transmit queue of the network interface device; and
    (e) popping the second pointer off the second transmit queue and then popping the first pointer off the first transmit queue, the popped second pointer being used to locate the second packet information, the located second packet information then being output from the network interface device in the form of a second TCP/IP packet, the popped first pointer being used to locate the first packet information, the located first packet information being output from the network interface device in the form of a first TCP/IP packet such that the second TCP/IP packet is output from the network interface device and to the network before the first TCP/IP packet is output from the network interface device and to the network.

2. The method of claim 1, wherein the first TCP/IP packet is a data packet, wherein the second TCP/IP packet is a control packet, and wherein the network interface device is coupled to a host computer by a parallel bus.

3. The method of claim 1, wherein the first transmit queue contains pointers associated with a first set of packets, and wherein the second transmit queue contains pointers associated with a second set of packets, the second set of packets having transmission priority over the first set of packets.

4. The method of claim 1, wherein the network interface device comprises a transmit sequencer, a memory, and MAC interface circuitry, the transmit sequencer causing the second packet information to be transferred from the memory to the MAC interface circuitry, the second TCP/IP packet being output from the network interface device through the MAC interface circuitry.

5. The method of claim 1, wherein the first TCP/IP packet is associated with a first TCP/IP connection, and wherein the second TCP/IP packet is associated with a second TCP/IP connection, and wherein the pushing of (b) occurs before the pushing of (d).

6. The method of claim 1, wherein the first packet information includes a header portion and a data payload portion.

7. The method of claim 1, wherein the first pointer is part of a buffer descriptor.

8. The method of claim 1, further comprising:
receiving onto the network interface device from the network a third packet;
fast-path processing the third packet on the network interface device such that a data payload portion of the third packet is written into a destination memory without a network protocol stack performing substantial transport or substantial network layer protocol processing on the third packet;
receiving onto the network interface device from the network a fourth packet; and
slow-path processing the fourth packet such that at least a data payload portion of the fourth packet is written into the destination memory, the network protocol stack performing substantial transport and substantial network layer protocol processing on the fourth packet.

9. The method of claim 1, wherein the second TCP/IP packet is a TCP ACK.

10. The method of claim 8, wherein the second TCP/IP packet is a TCP ACK.

11. The method of claim 1, wherein the second transmit queue is used for the transmission of TCP ACKs, and wherein the first transmit queue is used for the transmission of TCP/IP data packets, the second transmit queue being free of or substantially free of pointers to TCP/IP data packets.

12. The method of claim 8, wherein the network protocol stack is executed by a processor, the processor being a part of the network interface device.

13. The method of claim 8, wherein the network protocol stack is executed by a processor, the processor being a part of a host computer, the network interface device being coupled to the host computer.

14. A TCP/IP offload network interface device, comprising:
a memory containing first packet information and second packet information;
a processor that causes a first pointer to the first packet information to be pushed onto a first transmit queue before a second pointer to the second packet information is pushed onto a second transmit queue; and
a transmit mechanism that pops the second queue in preference to popping the first queue, the transmit mechanism popping the second pointer off the second queue and outputting the second packet information from the network interface device in the form of a second TCP/IP packet, the transmit mechanism popping the first pointer off the first queue and outputting the first packet information from the network interface device in the form of a first TCP/IP packet, the transmit mechanism popping the second pointer from the second queue before popping the first pointer off the first queue, the second TCP/IP packet being output from the network interface device before the first TCP/IP packet is output from the network interface device.

15. The TCP/IP offload network interface device of claim 14, wherein the first TCP/IP packet is a data packet, and wherein the second TCP/IP packet is a control packet.

16. The TCP/IP offload network interface device of claim 14, wherein the first TCP/IP packet is a data packet associated with a first TCP/IP connection, and wherein the second TCP/IP packet is a TCP ACK associated with a second TCP/IP connection.

17. The TCP/IP offload network interface device of claim 16, wherein the TCP/IP offload network interface device is operatively coupled to a host computer, the host computer executing a protocol processing stack.

18. The TCP/IP offload network interface device of claim 16, wherein the network interface device includes a second processor, the second processor executing a protocol processing stack, the second processor being part of the TCP/IP offload network interface device.

19. The TCP/IP offload network interface device of claim 16, wherein a template header having TCP fields and IP fields is stored on the TCP/IP offload network interface device, and wherein the processor executes a transmit finite state machine, the transmit finite state machine filling in the TCP fields and the IP fields of the template header, the filled in template header forming at least a part of the second packet information.

20. The TCP/IP offload network interface device of claim 19, wherein the transmit finite state machine does not include a TCP protocol processing layer and a discrete IP protocol processing layer, but rather the transmit finite state machine covers both TCP and IP protocol processing.

21. A method for outputting an acknowledge (ACK) from a protocol processing offload network interface device (PPONID), the PPONID being coupled to a network, the method comprising:
receiving a first packet onto the PPONID from the network;
slow-path processing the first packet such that a protocol processing stack performs substantial transport layer processing and substantial network layer processing on the first packet;
receiving a second packet onto the PPONID from the network;
fast-path processing the second packet on the PPONID such that the stack performs substantially no transport layer processing on the second packet and such that the stack performs substantially no network layer processing on the second packet;
pushing a first pointer to first packet information onto a first transmit queue;
in response to said receiving of the second packet pushing a second pointer to second packet information onto a second transmit queue;
popping the second transmit queue to retrieve the second pointer, and using the second pointer to retrieve the second packet information, and outputting the second packet information from the PPONID in the form of the ACK; and
popping the first transmit queue to retrieve the first pointer, and using the first pointer to retrieve the first packet information, and outputting the first packet information from the PPONID in the form of a third packet, the ACK being output from the PPONID before the third packet.

22. The method of claim 21, wherein PPONID is coupled to a host computer, and wherein the second packet includes a data payload, the data payload being transferred from the PPONID and to the host, the ACK being output from the PPONID before any portion of the data payload is transferred to the host.

23. A method for outputting a TCP ACK from a network interface device, the network interface device being coupled to a network, the method comprising:

receiving a first TCP/IP packet onto the network interface device from the network;

slow-path processing the first TCP/IP packet such that a protocol processing stack performs substantial TCP layer processing and substantial IP layer processing on the first TCP/IP packet;

receiving a second TCP/IP packet onto the network interface device from the network;

fast-path processing the second TCP/IP packet on the network interface device such that the stack performs substantially no TCP layer processing on the second TCP/IP packet and such that the stack performs substantially no IP layer processing on the second TCP/IP packet;

pushing a first pointer to third packet information onto a first transmit queue;

in response to said receiving of the second TCP/IP packet pushing a second pointer to fourth packet information onto a second transmit queue;

popping the second transmit queue to retrieve the second pointer, and using the second pointer to retrieve the fourth packet information, and outputting the fourth packet information from the network interface device in the form of the TCP ACK; and popping the first transmit queue to retrieve the first pointer, and using the first pointer to retrieve the third packet information, and outputting the third packet information from the network interface device in the form of a third TCP/IP packet, the TCP ACK being output from the network interface device before the third TCP/IP packet.

24. The method of claim 23, wherein the protocol processing stack executes on a host computer, the network interface device being coupled to the host computer.

25. The method of claim 23, wherein the protocol processing stack executes on a processor, the processor being part of the network interface device.

26. The method of claim 23, wherein the network interface device comprises a processor, the method further comprising the step of generating the fourth packet information, the step of generating the fourth packet information comprising:

accessing a template header stored on the network interface device, the template header having TCP fields and IP fields; and executing a finite state machine on the processor, the finite state machine filling in the TCP fields and the IP fields and thereby forming the fourth packet information without passing the fourth packet information or the template header down to any lower protocol processing layer in any protocol stack.

27. The method of claim 26, wherein the network interface device further comprises a transmit sequencer, the transmit sequencer causing the TCP ACK and the third TCP/IP packet to be output from the network interface device.

28. A method of generating an ACK on a TCP/IP offload device, comprising:

(a) step for using a template header to generate the ACK without sequentially processing the template header through a TCP protocol processing layer on the TCP/IP offload device and then processing the template header through an IP protocol processing layer on the TCP/IP offload device, the template header having TCP and IP fields, step (a) involving filling in the TCP and IP fields;

(b) pushing pointers to data packet information onto a first transmit queue, and then pushing a pointer to the filled-in template header onto a second transmit queue; and (c) popping the second transmit queue in preference to popping the first transmit queue such that the second transmit queue has transmission priority over the first transmit queue, and outputting from the TCP/IP offload device the filled-in template header in the form of the ACK, the data packet information being output from the TCP/IP offload device in the form of data packets, the ACK being output from the TCP/IP offload device before any of the data packets are output from the TCP/IP offload device.

29. A TCP/IP offload device, the TCP/IP offload device being coupled to a device that executes a protocol stack, wherein the TCP/IP offload device accelerates TCP and IP protocol processing of an incoming TCP/IP packet such that the stack performs substantially no TCP protocol processing on the TCP/IP packet and such that the stack performs substantially no IP protocol processing on the TCP/IP packet, and wherein a data portion of the TCP/IP packet is transferred from the TCP/IP offload device to the device that executes the protocol stack, the TCP/IP offload device comprising:

a first transmit queue containing pointers associated with a first set of packets; and a second transmit queue containing pointers associated with a second set of packets, wherein the second set of packets has transmission priority over the first set of packets.

30. The TCP/IP offload device of claim 29, wherein the TCP/IP packet is received onto the TCP/IP offload device from a network, and wherein the TCP/IP offload device includes means for outputting the first set of packets and the second set of packets from the TCP/IP offload device and to the network.

* * * * *